United States Patent
Bloch et al.

(10) Patent No.: US 9,832,516 B2
(45) Date of Patent: Nov. 28, 2017

(54) SYSTEMS AND METHODS FOR MULTIPLE DEVICE INTERACTION WITH SELECTABLY PRESENTABLE MEDIA STREAMS

(71) Applicant: JBF Interlude 2009 LTD—Israel, Tel Aviv-Yafo (IL)

(72) Inventors: Jonathan Bloch, Brooklyn, NY (US); Barak Feldman, Tenafly, NJ (US); Tal Zubalsky, Tel Aviv-Yafo (IL); Yuval Hofshy, Kfar Saba (IL)

(73) Assignee: JBF Interlude 2009 LTD, Tel Aviv-Yafo (IL)

(*) Notice: Subject to any disclaimer, the term of this patent is extended or adjusted under 35 U.S.C. 154(b) by 4 days.

(21) Appl. No.: 13/921,536

(22) Filed: Jun. 19, 2013

(65) Prior Publication Data
US 2014/0380167 A1    Dec. 25, 2014

(51) Int. Cl.
*H04N 21/8541* (2011.01)
*H04N 21/43* (2011.01)
(Continued)

(52) U.S. Cl.
CPC ..... *H04N 21/4307* (2013.01); *H04N 21/4758* (2013.01); *H04N 21/47205* (2013.01); *H04N 21/8456* (2013.01); *H04N 21/8541* (2013.01)

(58) Field of Classification Search
CPC .... G06F 21/606; G06F 9/3851; G06F 13/385; H04N 21/4307; H04N 21/47205; H04N 21/8456; H04N 21/8541
(Continued)

(56) References Cited

U.S. PATENT DOCUMENTS

| | | |
|---|---|---|
| 5,568,602 A | 10/1996 | Callahan et al. |
| 5,607,356 A | 3/1997 | Schwartz |
| 5,636,036 A | 6/1997 | Ashbey |
| 5,734,862 A | 3/1998 | Kulas |
| 5,818,435 A | 10/1998 | Kozuka et al. |
| 6,122,668 A | 9/2000 | Teng et al. |
| 6,128,712 A | 10/2000 | Hunt et al. |
| 6,191,780 B1 | 2/2001 | Martin et al. |
| 6,222,925 B1 | 4/2001 | Shiels et al. |

(Continued)

FOREIGN PATENT DOCUMENTS

| | | |
|---|---|---|
| DE | 10053720 A1 | 4/2002 |
| EP | 1033157 A2 | 9/2000 |

(Continued)

OTHER PUBLICATIONS

U.S. Appl. No. 12/706,721 Published as US2010/0293455, System and Method for Assembling a Recorded Composition, filed Feb. 17, 2010.

(Continued)

*Primary Examiner* — Jennifer To
*Assistant Examiner* — Terri Filosi
(74) *Attorney, Agent, or Firm* — Goodwin Procter LLP

(57) ABSTRACT

A system for multiple device interaction with selectably presentable multimedia content includes an output engine, an input engine, a manager, and a memory that stores selectably presentable multimedia content segments. Each content segment represents a predefined portion of one or more content paths. The output engine, executing on a first device, receives a subset of the content segments, assembles them into a seamless multimedia presentation that is one of the content paths, and plays the assembled multimedia presentation. The input engine, executing on a second device, receives user interactions associated with the multimedia presentation, and the manager coordinates the multimedia presentation among multiple devices based on the user interactions. A method implementing the above steps is also included.

28 Claims, 8 Drawing Sheets

(51) Int. Cl.
*H04N 21/472* (2011.01)
*H04N 21/475* (2011.01)
*H04N 21/845* (2011.01)

(58) Field of Classification Search
USPC ........................................................ 715/723
See application file for complete search history.

(56) References Cited

U.S. PATENT DOCUMENTS

| | | |
|---|---|---|
| 6,298,482 B1 | 10/2001 | Seidman et al. |
| 6,728,477 B1 | 4/2004 | Watkins |
| 6,801,947 B1 | 10/2004 | Li |
| 7,155,676 B2 | 12/2006 | Land et al. |
| 7,310,784 B1 | 12/2007 | Gottlieb et al. |
| 7,379,653 B2 | 5/2008 | Yap et al. |
| 7,444,069 B1 | 10/2008 | Bernsley |
| 7,627,605 B1 | 12/2009 | Lamere et al. |
| 7,917,505 B2 | 3/2011 | van Gent et al. |
| 8,065,710 B2 | 11/2011 | Malik |
| 8,190,001 B2 | 5/2012 | Bernsley |
| 8,276,058 B2 | 9/2012 | Gottlieb et al. |
| 8,281,355 B1 | 10/2012 | Weaver et al. |
| 8,600,220 B2 | 12/2013 | Bloch et al. |
| 8,650,489 B1 | 2/2014 | Baum et al. |
| 8,860,882 B2 | 10/2014 | Bloch et al. |
| 8,977,113 B1 | 3/2015 | Rumteen et al. |
| 9,009,619 B2 | 4/2015 | Bloch et al. |
| 9,021,537 B2 | 4/2015 | Funge et al. |
| 9,190,110 B2 | 11/2015 | Bloch |
| 9,257,148 B2 | 2/2016 | Bloch et al. |
| 9,271,015 B2 | 2/2016 | Bloch et al. |
| 2002/0091455 A1 | 7/2002 | Williams |
| 2002/0105535 A1 | 8/2002 | Wallace et al. |
| 2002/0106191 A1 | 8/2002 | Betz et al. |
| 2002/0120456 A1 | 8/2002 | Berg et al. |
| 2002/0177914 A1 | 11/2002 | Chase |
| 2003/0159566 A1 | 8/2003 | Sater et al. |
| 2003/0183064 A1 | 10/2003 | Eugene et al. |
| 2003/0184598 A1 | 10/2003 | Graham |
| 2003/0221541 A1 | 12/2003 | Platt |
| 2004/0138948 A1 | 7/2004 | Loomis |
| 2004/0172476 A1 | 9/2004 | Chapweske |
| 2005/0019015 A1 | 1/2005 | Ackley et al. |
| 2005/0055377 A1 | 3/2005 | Dorey et al. |
| 2005/0091597 A1 | 4/2005 | Ackley |
| 2005/0102707 A1 | 5/2005 | Schnitman |
| 2006/0028951 A1 | 2/2006 | Tozun et al. |
| 2006/0064733 A1 | 3/2006 | Norton et al. |
| 2006/0150072 A1 | 7/2006 | Salvucci |
| 2006/0155400 A1 | 7/2006 | Loomis |
| 2006/0200842 A1 | 9/2006 | Chapman et al. |
| 2006/0224260 A1 | 10/2006 | Hicken et al. |
| 2007/0024706 A1 | 2/2007 | Brannon et al. |
| 2007/0033633 A1 | 2/2007 | Andrews et al. |
| 2007/0118801 A1 | 5/2007 | Harshbarger et al. |
| 2007/0157261 A1 | 7/2007 | Steelberg et al. |
| 2007/0162395 A1 | 7/2007 | Ben-Yaacov et al. |
| 2007/0239754 A1 | 10/2007 | Schnitman |
| 2008/0021874 A1 | 1/2008 | Dahl et al. |
| 2008/0022320 A1 | 1/2008 | Ver Steeg |
| 2008/0031595 A1 | 2/2008 | Cho |
| 2008/0086754 A1 | 4/2008 | Chen et al. |
| 2008/0091721 A1 | 4/2008 | Harboe et al. |
| 2008/0092159 A1 | 4/2008 | Dmitriev et al. |
| 2008/0148152 A1 | 6/2008 | Blinnikka et al. |
| 2008/0276157 A1 | 11/2008 | Kustka et al. |
| 2008/0300967 A1 | 12/2008 | Buckley et al. |
| 2008/0301750 A1 | 12/2008 | Silfvast et al. |
| 2008/0314232 A1 | 12/2008 | Hansson et al. |
| 2009/0022015 A1 | 1/2009 | Harrison |
| 2009/0024923 A1 | 1/2009 | Hartwig et al. |
| 2009/0055880 A1 | 2/2009 | Batteram et al. |
| 2009/0063681 A1 | 3/2009 | Ramakrishnan et al. |
| 2009/0116817 A1 | 5/2009 | Kim et al. |
| 2009/0199697 A1 | 8/2009 | Lehtiniemi et al. |
| 2009/0228572 A1 | 9/2009 | Wall et al. |
| 2009/0320075 A1 | 12/2009 | Marko |
| 2010/0017820 A1 | 1/2010 | Thevathasan et al. |
| 2010/0042496 A1 | 2/2010 | Wang et al. |
| 2010/0077290 A1 | 3/2010 | Pueyo |
| 2010/0146145 A1 | 6/2010 | Tippin et al. |
| 2010/0153512 A1 | 6/2010 | Balassanian et al. |
| 2010/0161792 A1 | 6/2010 | Palm et al. |
| 2010/0167816 A1 | 7/2010 | Perlman et al. |
| 2010/0186579 A1 | 7/2010 | Schnitman |
| 2010/0262336 A1 | 10/2010 | Rivas et al. |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1* | 11/2010 | van Zwol et al. ............ 715/723 |
| 2010/0293455 A1 | 11/2010 | Bloch |
| 2010/0332404 A1 | 12/2010 | Valin |
| 2011/0007797 A1 | 1/2011 | Palmer et al. |
| 2011/0010742 A1 | 1/2011 | White |
| 2011/0026898 A1 | 2/2011 | Lussier et al. |
| 2011/0041059 A1 | 2/2011 | Amarasingham et al. |
| 2011/0096225 A1 | 4/2011 | Candelore |
| 2011/0126106 A1 | 5/2011 | Ben Shaul et al. |
| 2011/0131493 A1 | 6/2011 | Dahl |
| 2011/0138331 A1 | 6/2011 | Pugsley et al. |
| 2011/0191684 A1 | 8/2011 | Greenberg |
| 2011/0197131 A1 | 8/2011 | Duffin et al. |
| 2011/0200116 A1 | 8/2011 | Bloch et al. |
| 2011/0202562 A1 | 8/2011 | Bloch et al. |
| 2011/0246885 A1 | 10/2011 | Pantos et al. |
| 2011/0252320 A1* | 10/2011 | Arrasvuori et al. .......... 715/704 |
| 2011/0264755 A1 | 10/2011 | Salvatore De Villiers |
| 2012/0005287 A1 | 1/2012 | Gadel et al. |
| 2012/0017141 A1 | 1/2012 | Eelen et al. |
| 2012/0094768 A1 | 4/2012 | McCaddon et al. |
| 2012/0110620 A1 | 5/2012 | Kilar et al. |
| 2012/0198412 A1 | 8/2012 | Creighton et al. |
| 2012/0308206 A1 | 12/2012 | Kulas |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0259442 A1 | 10/2013 | Bloch et al. |
| 2013/0282917 A1 | 10/2013 | Reznik et al. |
| 2014/0040280 A1 | 2/2014 | Slaney et al. |
| 2014/0078397 A1 | 3/2014 | Bloch et al. |
| 2014/0082666 A1 | 3/2014 | Bloch et al. |
| 2014/0129618 A1 | 5/2014 | Panje et al. |
| 2014/0178051 A1 | 6/2014 | Bloch et al. |
| 2014/0270680 A1 | 9/2014 | Bloch et al. |
| 2014/0282013 A1 | 9/2014 | Amijee |
| 2014/0380167 A1 | 12/2014 | Bloch et al. |
| 2015/0067723 A1 | 3/2015 | Bloch et al. |
| 2015/0104155 A1 | 4/2015 | Bloch et al. |
| 2015/0179224 A1 | 6/2015 | Bloch et al. |
| 2015/0181301 A1 | 6/2015 | Bloch et al. |
| 2015/0199116 A1 | 7/2015 | Bloch et al. |
| 2015/0293675 A1 | 10/2015 | Bloch et al. |
| 2015/0294685 A1 | 10/2015 | Bloch et al. |

FOREIGN PATENT DOCUMENTS

| | | |
|---|---|---|
| EP | 2104105 A1 | 9/2009 |
| GB | 2359916 A | 9/2001 |
| GB | 2428329 A | 1/2007 |
| JP | 2008005288 A | 1/2008 |
| WO | WO-2000/059224 A1 | 10/2000 |
| WO | WO-2007/062223 A2 | 5/2007 |
| WO | WO-2007/138546 A2 | 12/2007 |
| WO | WO-2008/001350 A2 | 1/2008 |
| WO | WO-2008/057444 A2 | 5/2008 |
| WO | WO-2008052009 A2 | 5/2008 |
| WO | WO-2009/137919 A1 | 11/2009 |

OTHER PUBLICATIONS

U.S. Appl. No. 13/622,780, Systems and Methods for Constructing Multimedia Content Modules, filed Sep. 19, 2012.

(56) References Cited

OTHER PUBLICATIONS

U.S. Appl. No. 13/622,795, Progress Bar for Branched Videos, filed Sep. 19, 2012.
U.S. Appl. No. 13/838,830, Systems and Methods for Synchronization of Selectably Presentable Media Streams, filed Mar. 15, 2013.
U.S. Appl. No. 14/107,600, Methods and Systems for Unfolding Pre-Roll, filed Dec. 16, 2013.
U.S. Appl. No. 14/139,996, Methods and Systems for In-Video Library, filed Dec. 24, 2013.
U.S. Appl. No. 12/706,721, the Office Actions dated Apr. 26, 2012, Aug. 17, 2012, Mar. 28, 2013, Jun. 20, 2013 and Jan. 3, 2014.
U.S. Appl. No. 13/033,916, the Office Actions dated Jun. 7, 2013 and Jan. 2, 2014.
U.S. Appl. No. 13/034,645, the Office Actions dated Jul. 23, 2012 and Mar. 21, 2013.
U.S. Appl. No. 13/622,780, the Office Action dated Jan. 16, 2014.
U.S. Appl. No. 13/622,780 Published as US2014/0078397, Systems and Methods for Constructing Multimedia Content Modules, filed Sep. 19, 2012.
U.S. Appl. No. 13/622,795 Published as US2014/0082666, Progress Bar for Branched Videos, filed Sep. 19, 2012.
U.S. Appl. No. 12/706,721, the Office Actions dated Apr. 26, 2012, Aug. 17, 2012, Mar. 28, 2013, Jun. 20, 2013, and Jan. 3, 2014.
An ffmpeg and SDL Tutorial, "Tutorial 05: Synching Video," Retrieved from internet on Mar. 15, 2013: <http://drancier.com/ffmpeg/tutoria105.html>, (4 pages).
Archos Gen 5 English User Manual Version 3.0, Jul. 26, 2007, pp. 1-81.
International Search Report for International Patent Application PCT/IL2012/000080 dated Aug. 9, 2012 (4 pages).
International Search Report for International Patent Application PCT/IL2012/000081 dated Jun. 28, 2012 (4 pages).
International Search Report for International Patent Application PCT/IL2010/000362 dated Aug. 25, 2010 (2 pages).
Supplemental European Search Report for EP10774637.2 (PCT/IL2010/000362) dated Jun. 20, 2012 (6 pages).
Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, (pp. 1-8).
Yang, H, et al., "Time Stamp Synchronization in Video Systems," Teletronics Technology Corporation, <http://www.ttcdas.com/products/daus encoders/pdf/ tech papers/tp 2010 time stamp video system.pdf>, Abstract, (8 pages).
Barlett, Mitch, "iTunes 11: How to Queue Next Song," *Technipages*, Oct. 6, 2008, pp. 1-8, retrieved on Dec. 26, 2013 from the internet http://www.technipages.com/itunes-queue-next-song.html.
Gregor Miller et al. "MiniDiver: A Novel Mobile Media Playback Interface for Rich Video Content on an iPhoneTM", *Entertainment Computing A ICEC* 2009, Sep. 3, 2009, pp. 98-109.
International Search Report and Writton Opinion for International Patent Application PCT/IB2013/001000 dated Jul. 31, 2013 (12 pages).
Sodagar, I., (2011) "The MPEG-DASH Standard for Multimedia Streaming Over the Internet", *IEEE Multimedia*, IEEE Service Center, New York, NY US, vol. 18, No. 4, pp. 62-67.
Supplemental European Search Report for EP13184145 dated Jan. 30, 2014 (6 pages).
U.S. Appl. No. 12/706,721 9,190,110 Published as US2010/0293455, System and Method for Assembling a Recorded Composition, filed Feb. 17, 2010.
U.S. Appl. No. 13/033,916 Published as US2011/0200116, System and Method for Seamless Multimedia Assembly, filed Feb. 24, 2011.
U.S. Appl. No. 13/034,645 Published as US2011/0202562, System and Method for Data Mining Within Interactive Multimedia, filed Feb. 24, 2011.
U.S. Appl. No. 14/884,285, System and Method for Assembling a Recorded Composition, filed Oct. 15, 2015.
U.S. Appl. No. 13/437,164 8,600,220 Published as US2013/0259442 Systems and Methods for Loading More Than One Video Content at a Time, filed Apr. 2, 2012.
U.S. Appl. No. 14/069,694 9,271,015 Published as US2014/0178051, Systems and Methods for Loading More Than One Video Content at a Time, filed Nov. 1, 2013.
U.S. Appl. No. 13/622,780 8,860,882 Published as US2014/0078397, Systems and Methods for Constructing Multimedia Content Modules, filed Sep. 19, 2012.
U.S. Appl. No. 13/622,795 9,009,619 Published as US2014/0082666, Progress Bar for Branched Videos, filed Sep. 19, 2012.
U.S. Appl. No. 14/639,579 Published as US2015/0199116, Progress Bar for Branched Videos, filed Mar. 5, 2015.
U.S. Appl. No. 13/838,830 9,257,148 Published as US2014/0270680, System and Method for Synchronization of Selectably Presentable Media Streams, filed Mar. 15, 2013.
U.S. Appl. No. 14/984,821, System and Method for Synchronization of Selectably Presentable Media Streams, filed Dec. 30, 2015.
U.S. Appl. No. 14/107,600 Published as US2015/0067723, Methods and Systems for Unfolding Video Pre-Roll, filed Dec. 16, 2013.
U.S. Appl. No. 14/335,381 Published as US2015/0104155, Systems and Methods for Real-Time Pixel Switching, filed Jul. 18, 2014.
U.S. Appl. No. 14/139,996 Published as US2015/0181301, Methods and Systems for In-Video Library, filed Dec. 24, 2013.
U.S. Appl. No. 14/140,007 Published as US2015/0179224, Methods and Systems for Seeking to Non-Key Frames, filed Dec. 24, 2013.
U.S. Appl. No. 14/249,627 Published as US2015/0294685, Systems and Methods for Creating Linear Video From Branched Video, filed Apr. 10, 2014.
U.S. Appl. No. 14/249,665 Published as US2015/0293675, Dynamic Timeline For Branched Video, filed Apr. 10, 2014.
U.S. Appl. No. 14/509,700, Systems and Methods for Dynamic Video Bookmarking, filed Oct. 8, 2014.
U.S. Appl. No. 14/534,626, Systems and Methods for Parallel Track Transitions, filed Nov. 6, 2014.
U.S. Appl. No. 14/700,845, Systems and Methods for Nonlinear Video Playback Using Linear Real-Time Video Players, filed Apr. 30, 2015.
U.S. Appl. No. 14/700,862, Systems and Methods for Seamless Media Creation, filed Apr. 30, 2015.
U.S. Appl. No. 14/835,857, Systems and Methods for Adaptive and Responsive Video, filed Aug. 26, 2015.
U.S. Appl. No. 14/978,464, Intelligent Buffering of Large-Scale Video, filed Dec. 22, 2015.
U.S. Appl. No. 14/978,491, Seamless Transitions In Large-Schale Vidoe, filed Dec. 22, 2015.
U.S. Appl. No. 15/085,209, Media Stream Rate Synchronization, filed Mar. 30, 2016.

* cited by examiner

SYSTEMS AND METHODS FOR MULTIPLE DEVICE INTERACTION WITH SELECTABLY PRESENTABLE MEDIA STREAMS

FIELD OF THE INVENTION

The invention relates generally to providing interactive multimedia content over multiple devices, and more particularly to systems and methods for managing the interaction of multiple input and output devices with a seamless multimedia presentation having selectably presentable content segments.

BACKGROUND

Over the past decade there has been an exponential growth in the prevalence of streaming media in the lives of the general public. Users frequently listen to streaming music on Internet radio stations such as Pandora, and watch streaming television shows, movies, and video clips on websites such as Hulu, Netflix, and YouTube. Interactive streaming multimedia content, though less common, is also available. Existing forms of interactive videos allow a viewer to make choices on how to proceed through predefined video paths; however, this functionality is accomplished using separate video segments that are jumped to upon selection, resulting in a noticeable disconnect in audio and video between consecutive segments. Further, these forms of interactive media rely on a single device for receiving user interactions and playing the resulting audio and video for the user. Accordingly, users would benefit from systems and methods for interacting with selectably presentable multimedia content through multiple input and/or output devices.

SUMMARY OF THE INVENTION

Methods and systems are disclosed for multiple device control and interaction with selectably presentable media content, such as a segmented video presentation that, as it is assembled in real-time based on viewer choices, is seamlessly played for the viewers, such that the video appears to be a single, linear presentation without noticeable gaps, jumps, or delays. Various devices may be used as output devices to view the multimedia content, and/or as input devices to interact with and make choices affecting playback of the content.

In one aspect, a system for multiple device interaction with selectably presentable multimedia content includes an output engine, an input engine, a manager, and a memory that stores selectably presentable multimedia content segments. Each content segment represents a predefined portion of one or more content paths. The output engine, executing on a first device, receives a subset of the content segments, assembles them into a seamless multimedia presentation that is one of the content paths, and plays the assembled multimedia presentation. The input engine, executing on a second device, receives user interactions associated with the multimedia presentation, and the manager coordinates the multimedia presentation among multiple devices based on the user interactions.

At least one of the content segments may include a predefined decision period during which a user may select, as that content segment is playing, a subsequent content segment to be played immediately following the conclusion or selection of the playing content segment.

In one embodiment, the input engine presents to a user, during a predefined decision period as a content segment is playing, visual representations of two or more alternative content segments from which a subsequent content segment may be selected. The input engine may also present to the user, upon reaching the predefined decision period, a visual representation of the time left to select an alternative content segment.

In some implementations, there are multiple input engines, each configured to execute on a different device. Each input engine may provide interactive options to a user based on a characteristic of a device user and/or a device.

In another embodiment, there are multiple output engines, each configured to execute on a different device. The output engines may play the assembled multimedia presentation at the same time, in accordance with a common timeline. Each assembled multimedia presentation may include the same set of content segments, causing the output engines to play the same multimedia presentation. Alternatively, some of the assembled multimedia presentations may include different content segments, thereby causing those output engines to play different multimedia presentations.

In various embodiments, the manager is configured to execute on the first device, the second device, and/or a third device. The manager may include an event analyzer that evaluates user interactions received from the input engine and, based on the evaluation, selects content segments to provide to the output engine.

In a further implementation, to coordinate the multimedia presentation, the devices are synchronized to a common timeline. The input engine may receive user interactions simultaneously with playback of the multimedia presentation by the output engine.

In another aspect, a method for multiple device interaction with selectably presentable multimedia content includes the step of storing selectably presentable multimedia content segments, with each content segment representing a predefined portion of one or more content paths. An output engine, executing on a first device, receives a subset of the content segments, assembles them into a seamless multimedia presentation that is one of the content paths, and plays the assembled multimedia presentation. An input engine, executing on a second device, receives user interactions associated with the multimedia presentation, and a manager coordinates the multimedia presentation among multiple devices based on the user interactions.

At least one of the content segments may include a predefined decision period during which a user may select, as that content segment is playing, a subsequent content segment to be played immediately following the conclusion or selection of the playing content segment.

In one embodiment, the input engine presents to a user, during a predefined decision period as a content segment is playing, visual representations of two or more alternative content segments from which a subsequent content segment may be selected. The input engine may also present to the user, upon reaching the predefined decision period, a visual representation of the time left to select an alternative content segment.

In some implementations, there are multiple input engines, each configured to execute on a different device. Each input engine may provide interactive options to a user based on a characteristic of a device user and/or a device.

In another embodiment, there are multiple output engines, each configured to execute on a different device. The output engines may play the assembled multimedia presentation at the same time, in accordance with a common timeline. Each assembled multimedia presentation may include the same set of content segments, causing the output engines to play the same multimedia presentation. Alternatively, some of the assembled multimedia presentations may include different content segments, thereby causing those output engines to play different multimedia presentations.

In various embodiments, the manager is configured to execute on the first device, the second device, and/or a third device. The manager may include an event analyzer that evaluates user interactions received from the input engine and, based on the evaluation, selects content segments to provide to the output engine.

In a further implementation, to coordinate the multimedia presentation, the devices are synchronized to a common timeline. The input engine may receive user interactions simultaneously with playback of the multimedia presentation by the output engine.

Other aspects and advantages of the invention will become apparent from the following drawings, detailed description, and claims, all of which illustrate the principles of the invention, by way of example only

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Figure 1:
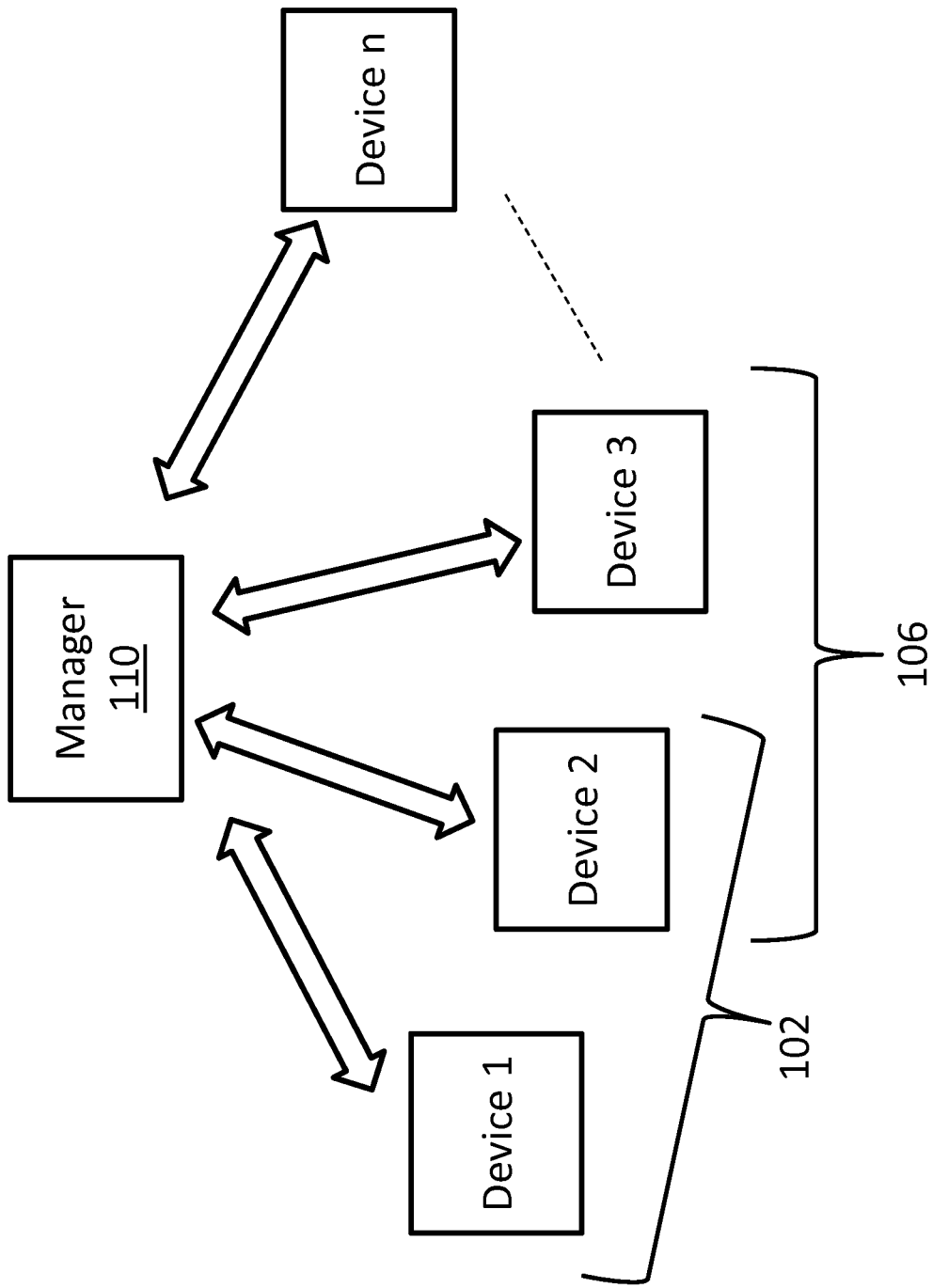
FIG. 1 is an exemplary diagram illustrating a system network according to an embodiment of the invention.

Described herein are various embodiments of methods and supporting systems for managing the interaction of multiple input and output devices with a seamless multimedia presentation having selectably presentable content segments. The disclosed techniques may be used in conjunction with seamlessly assembled and selectably presentable multimedia content, such as that described in U.S. patent application Ser. No. 13/033,916, filed Feb. 24, 2011, and entitled "System and Method for Seamless Multimedia Assembly," the entirety of which is incorporated by reference herein.

Selectably presentable multimedia content may include, for example, one or more predefined, separate multimedia content segments that are combined to create a continuous, seamless presentation such that there are no noticeable gaps, jumps, freezes, or other visual or audible interruptions to video or audio playback between segments. In addition to the foregoing, "seamless" may refer to a continuous playback of content that gives the viewer the appearance of watching a single, linear multimedia presentation. In some instances, the viewer is permitted to make choices or otherwise interact in real-time at decision points or during decision periods interspersed throughout the multimedia content. Decision points and/or decision periods may occur at any time and in any number during a multimedia segment, including at or near the end. Decision points and/or periods may be predefined, occurring at fixed points or during fixed periods in the multimedia content segments. Based at least in part on the viewer's choices, one or more corresponding multimedia segment(s) associated with the choices may be presented to the viewer.

The chosen multimedia segment(s) may be presented immediately following a currently playing segment, or may be shown after other segments are played. Further, the chosen multimedia segment(s) may be presented to the viewer immediately after selection, after a fixed or random delay, at the end of a decision period, and/or at the end of the currently playing segment. Two or more combined segments form a seamless multimedia content path, and there may be multiple paths that a viewer can take to experience a complete, start-to-finish, seamless presentation. Further, one or more multimedia segments may be shared among intertwining paths while still ensuring a seamless transition from a previous segment and to the next segment. The content paths may be predefined, with fixed sets of possible transitions in order to ensure seamless transitions among segments.

Traversal of the multimedia content along a content path may be performed by selecting among options that appear on and/or around the video while the video is playing. In some embodiments, these options are presented to viewers at a decision point and/or during a decision period in a content segment. The display may hover and then disappear when the decision period ends or when an option has been selected. Further, a countdown or other visual, aural, or other sensory indicator may be presented during playback of content segment to inform the viewer of the point by which he must make his selection. For example, the countdown may indicate when the decision period will end.

The segment that is played after a currently playing segment may be determined based on the option selected. Each option may result in a different video and audio segment being played. As previously mentioned, the transition to the next segment may occur immediately upon selection, at the end of the current segment, or at some other predefined or random point. Notably, the transition between content segments may be seamless. In other words, the audio and video may continue playing regardless of whether a segment selection is made, and no noticeable gaps appear in audio or video playback between any connecting segments. In some instances, the video continues on to another segment after a certain amount of time if none is chosen, or may continue playing in a loop.

In one example, the multimedia content is a music video in which the viewer selects options upon reaching segment decision points to determine subsequent content to be played. First, a video introduction segment is played for the viewer. Prior to the end of the segment, a decision point is reached at which the viewer may select the next segment to be played from a listing of choices. In this case, the viewer is presented with a choice as to who will sing the first verse of the song: a tall, female performer, or a short, male performer. The viewer is given an amount of time to make a selection (i.e., a decision period), after which, if no selection is made, a default segment will be automatically selected. The default may be a predefined or random selection. Of note, the media content continues to play during the time the viewer is presented with the choices. Once a choice is selected (or the decision period ends), a seamless transition occurs to the next segment, meaning that the audio and video continue on to the next segment as if there were no break between the two segments and the user cannot visually or audibly detect the transition. As the music video continues, the viewer is presented with other choices at other decisions points, depending on which path of choices is followed. Ultimately, the viewer arrives at a final segment, having traversed a complete multimedia content path.

Although the techniques described herein relate primarily to audio and video playback, the invention is equally applicable to various streaming and non-streaming media, including animation, video games, interactive media, and other forms of content usable in conjunction with the present systems and methods. Further, there may be more than one audio, video, and/or other media content stream played in synchronization with other streams. Streaming media may include, for example, multimedia content that is continuously presented to a viewer while it is received from a content delivery source, such as a remote video server. If a source media file is in a format that cannot be streamed and/or does not allow for seamless connections between segments, the media file may be transcoded or converted into a format supporting streaming and/or seamless transitions.

Referring to FIG. 1, in one embodiment, a system for managing the interaction of one or more input devices 102 and one or more output devices 106 with a seamless multimedia presentation includes a Manager 110. The Manager 110 synchronizes between the input device(s) 102 and the output device(s) 106 to allow for one or more of the input devices 102 to control and/or interact with the multimedia presentation shown on one or more of the output devices 106. Users and/or viewers may interact with the multimedia presentation through various input devices 102, such as desktop computers, laptops, televisions, smartphones, cellular phones, tablets, gaming devices, DVD players, media players, set-top boxes, and/or any devices having a suitable input interface such as a keyboard, mouse, trackball, touchpad, touchscreen, remote control, eye tracker, motion tracker, microphone, and the like. The multimedia presentation is presented to users and/or viewers via output devices 106, such as desktop computers, laptops, televisions, smartphones, cellular phones, tablets, gaming devices, DVD players, media players, set-top boxes, and/or any devices having a suitable visual display, audio, and/or other sensory output interface such as a display screen, projector, speaker, and the like.

A single device may perform both input and output functions. For example, a smartphone may allow a user to provide input using a touchscreen, while viewing the multimedia presentation on the display screen of the phone. Alternatively, a single device may have both input and output capabilities, but may only be used for either input or output. For example, the smartphone may be used as an input device to interact with a video that is being played on a television.

Figure 2:
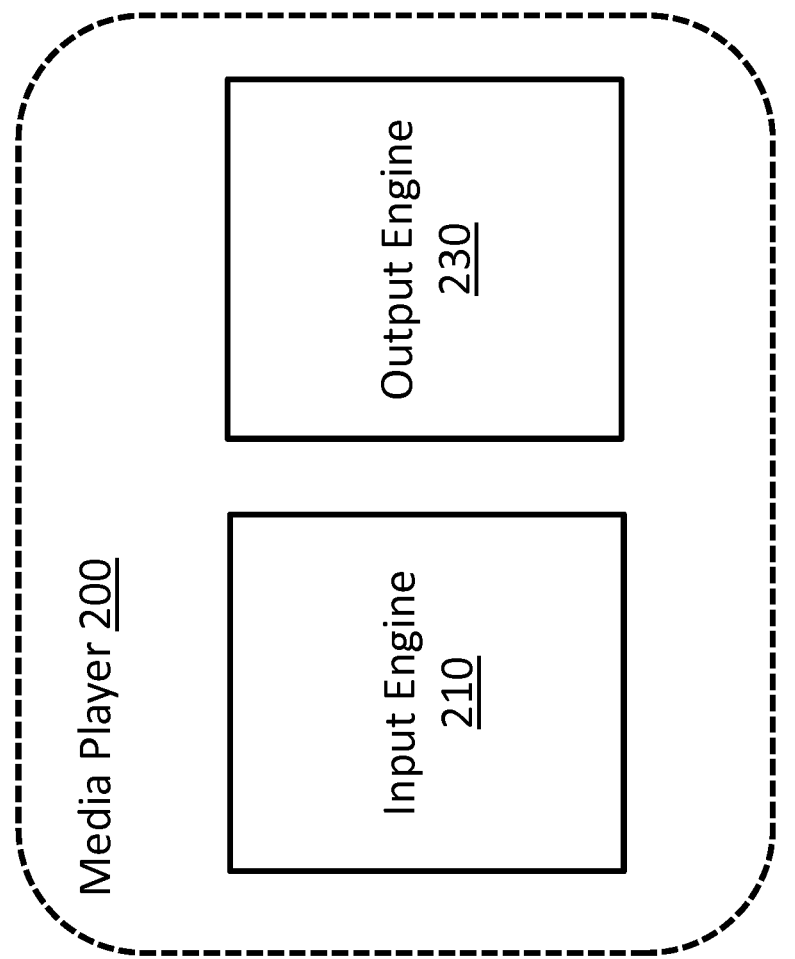
FIG. 2 is an exemplary diagram illustrating a media player according to an embodiment of the invention.

Referring now to FIG. 2, in one implementation, the system includes a media player 200 having an input engine 210 and an output engine 230. Generally, each input engine 210 is responsible for presenting choices to a user (e.g., via a graphical user interface displayed on the associated input device 102), receiving choice selections and other interactions with the user, and providing the interactions to the Manager 110. On the other hand, each output engine 230 receives instructions from the Manager 110, which may be based on interactions provided by one or more of the input engines 210, and plays the seamless multimedia presentation in accordance with the received instructions.

Referring again to FIG. 1, each input device 102 may have an input engine 210 stored on and/or executable by the input device 102. Likewise, each output device 106 may have an output engine 230 stored on and/or executable by the output device 106. A device that is capable of acting both as an input device 102 and an output device 106 may include both an input engine 210 and an output engine 230, one or both of which may be active at any point in time. The system may include one or more input engines 210 and/or one or more output engines 230, each corresponding to a respective input and/or output device 102, 106.

Figure 3A:
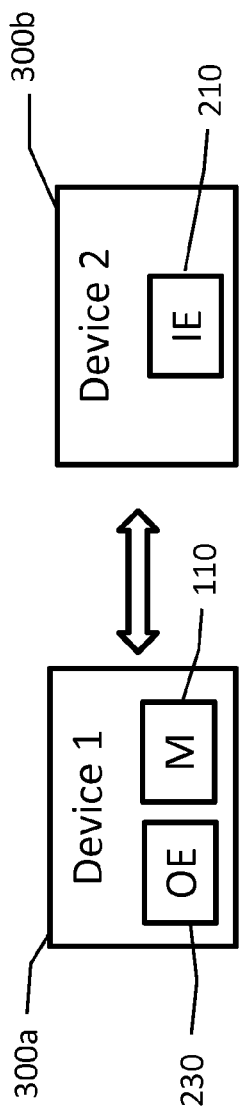
FIGS. 3A-3G are exemplary diagrams illustrating component location configurations according to various embodiments of the invention.

The Manager 110, input engine(s) 210 and output engine(s) 230 may be distributed among the input and output devices 102, 106. In some implementations, however, the Manager 110 is stored on and/or executable by a separate system, such as a server in communication with the input and output devices 102, 106. As depicted in FIG. 3A-3G, various configurations are possible for the Manager 110, input engine(s) 210, and output engine(s) 230. FIG. 3A depicts two devices 300a and 300b. Device 300a acts as an output device and includes the output engine 230 of the media player. In this embodiment, Device 300a also holds the Manager 110, which communicates with the output engine 230 via a local intradevice connection, and communicates with the input engine 210 on device 300b via a remote interdevice connection. The devices may communicate with each other over any suitable form of connection medium and method, wired and/or wireless, including networks such as cellular, computer, cable, telephone, radio, the Internet, and so on.

Figure 3B:
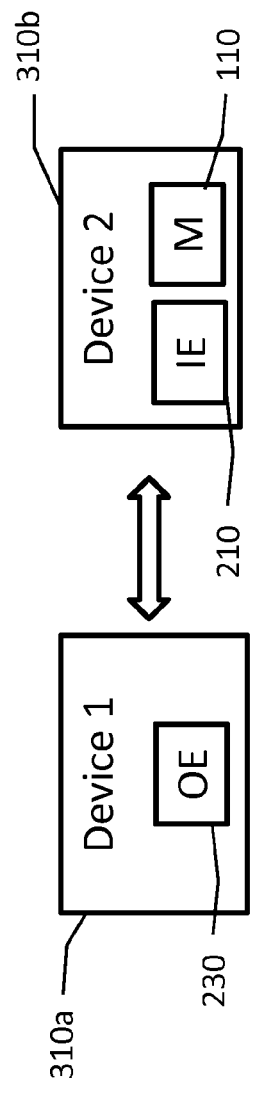
Figure 3C:
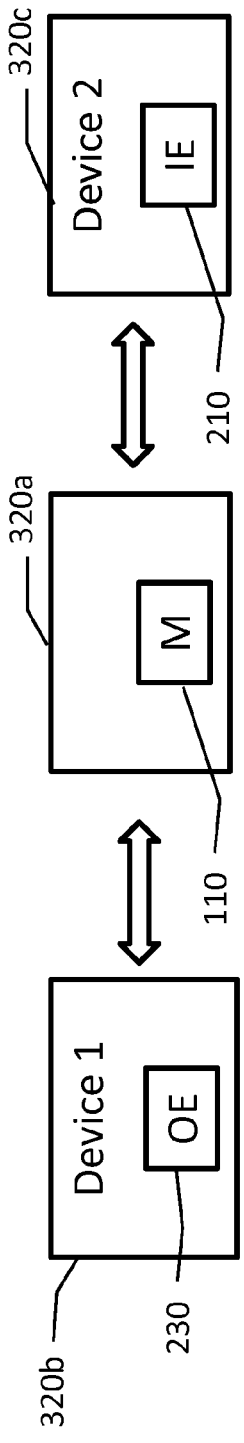

FIG. 3B depicts a configuration similar to FIG. 3A, with two devices 310a and 310b; however, in this implementation, the Manager 110 resides with the input engine 210 on device 310b. Accordingly, communication between the Manager 110 and the input engine 210 may be locally based, whereas communication between the Manager 110 and the output engine 230 may be remotely based. In FIG. 3C, the Manager 110 resides on a separate system 320a. For example, the Manager 110 may reside on a remote server, and the output engine 230 on device 320b and input engine 210 on device 320c may act as clients communicating with the remote server from the same location or different locations.

Figure 3D:
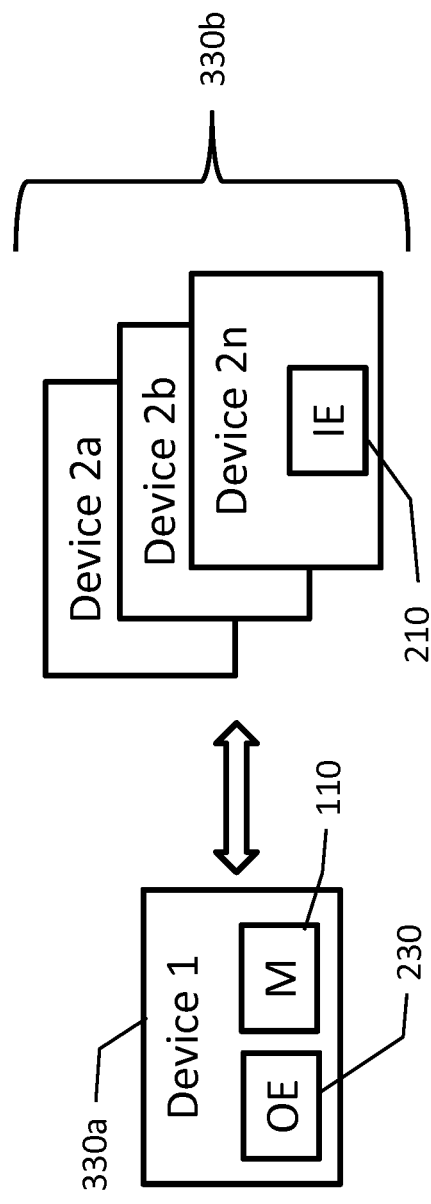
Figure 3E:
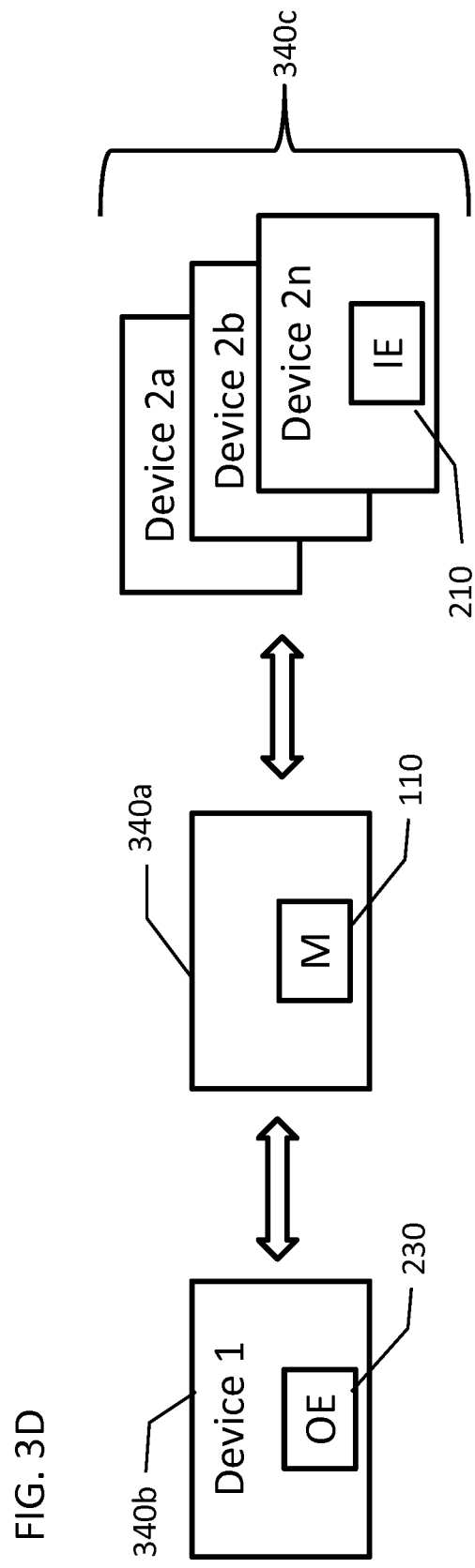
Figure 3F:
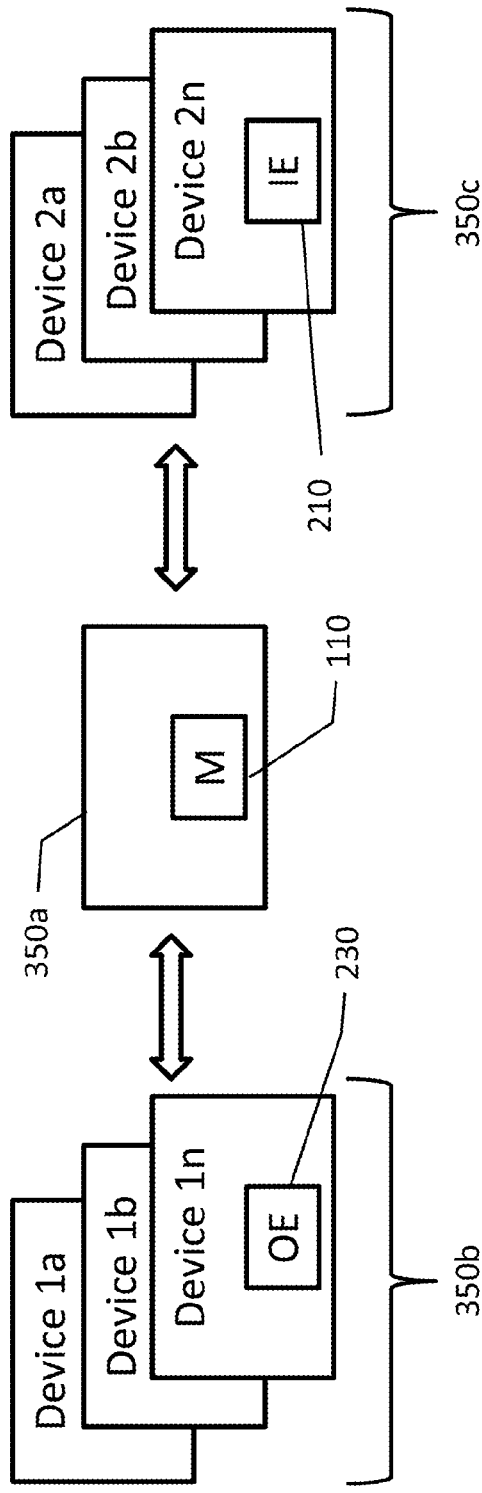
Figure 3G:
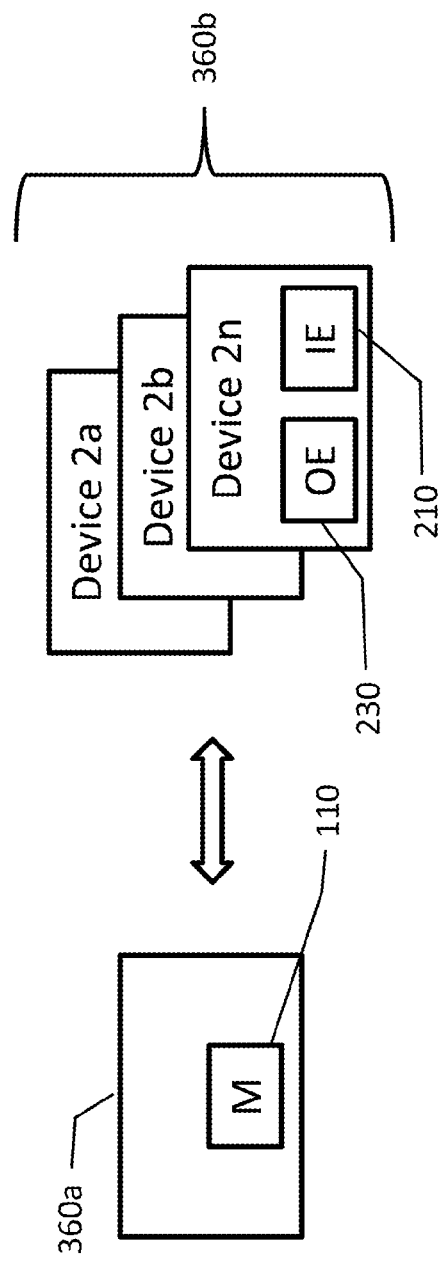

FIG. 3D shows the case of a single output engine 230 and Manager 110 residing on an output device 330a, with multiple input engines and corresponding input devices 330b in communication with the Manager 110. For example, three friends may view the interactive music video described above on a television (output device), and each may use his smartphone (input devices) to vote on the various options shown during a decision period. The option chosen by the most voters may then be presented following the end of the decision period. FIG. 3E illustrates a similar configuration to that of FIG. 3D; however, in FIG. 3E, the Manager 110 resides on a separate system 340a instead of on an output device 340b or input device 340c. Likewise, in FIG. 3F, the Manager 110 resides on a separate system 350a and communicates with multiple output devices 350b and multiple input devices 350c. Further, as shown in FIG. 3G, the devices 360b include both input and output engines 210, 230 of the media player, and as such may act as both input and output devices. As described above, the multiple viewers may be co-located (e.g., sitting in the same room watching the same instance of the music video). In some cases, however, the multiple users may be geographically dispersed such that votes are collected from multiple locations, tallied, and the subsequently-viewed segments are determined based on the results.

Other configurations are also possible. For example, in other embodiments, the Manager 110 may include multiple components that may be distributed among the input devices 102, output devices 106, and/or other systems or devices. There may also be more than one Manager 110, each of which may work independently or in synchronization with one or more of the other management components.

Figure 4:
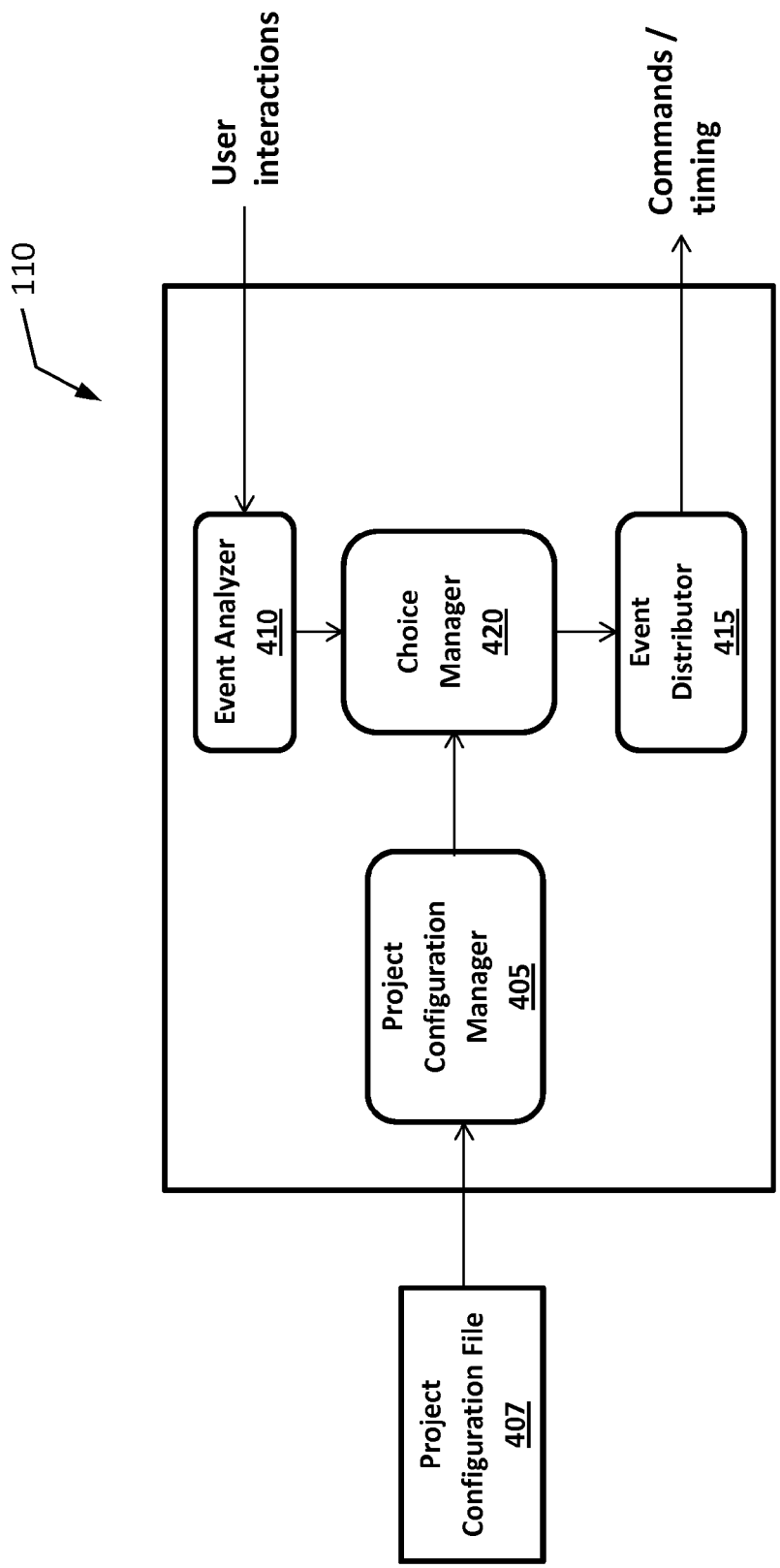
FIG. 4 is an exemplary diagram illustrating a manager component according to an embodiment of the invention.

The Manager 110, depicted in further detail in FIG. 4, includes a number of functions. In one embodiment, the Manager 110 is responsible for maintaining synchronization among all of the devices interacting with and/or playing back the multimedia presentation so that user interactions affect the multimedia presentation in substantially real-time while the presentation is playing. More specifically, the Manager 110 may synchronize the devices to a single timeline on which some or all events related to the multimedia presentation are based. Such events may include the start and end time of a content segment, the start and end time of a decision period within a content segment, the timing for providing one or more viewers with options to select or other interactive user interface features, the selection of a particular option, pause/stop/play events, and other events related to playback and/or interaction with the multimedia presentation.

The Manager 110 may also be responsible for session initialization. For example, when a session begins (e.g., prior to or as a multimedia presentation begins playback), each device (input and/or output) establishes communication with the Manager 110 to inform the Manager 110 that the respective device intends to participate in the session. Each device may also indicate whether it will be acting as an input device, an output device, or both. Upon successfully initializing the session, the Manager 110 has knowledge of the number and type of devices participating in the session, the devices that will act as input and/or output devices, and various information associated with participating users, such as login name, IP address, location, social networking account user name, and the like. At this point, each device may be permitted to engage in unidirectional or bidirectional communication with the Manager 110.

In one embodiment, the Manager 110 includes a Project Configuration Manager 405, an Event Analyzer 410, an Event Distributer 415, and a Choice Manager 420.

The Project Configuration Manager 405 reads from a project configuration file 407 that stores the defined content path structure of the multimedia presentation, e.g., how the multimedia content segments may be linked together in various manners to form one or more content paths (in some embodiments, a video tree). The configuration file 407 may further specify which audio, video, and/or other media files correspond to each content segment, i.e., which audio, video, and/or other media should be retrieved when the Manager 110 determines that a particular content segment should be played. Additionally, the configuration file 407 may indicate the interface elements that should be displayed or otherwise presented to users, as well as the when the elements should be displayed.

In some embodiments, the configuration file 407 is also used in determining which media files should be loaded or buffered prior to being played (or potentially played). Because decision periods may occur near the end of a segment, it may be necessary to begin transfer of one or more of the potential next segments to viewers prior to a selection being made. For example, if a viewer is approaching a decision point with three possible next segments for selection, all three potential segments may be loaded to ensure a smooth transition upon conclusion of the current segment. Intelligent buffering of the video, audio, and/or other media content may be performed as described in U.S. patent application Ser. No. 13/437,164, filed Apr. 2, 2012, and entitled "Systems and Methods for Loading More Than One Video Content at a Time," the entirety of which is incorporated by reference herein.

As earlier indicated, the Project Configuration Manager 405 may reference the configuration file 407 to determine which interface elements should be displayed to viewers. The configuration file 407 may further indicate the specific timings for which actions may be taken with respect to the interface elements (e.g., when a particular element is active and can be interacted with). The interface elements may include, for example, playback controls (pause, stop, play, seek, etc.), segment option selectors (e.g., buttons, images, text, animations, video thumbnails, and the like, that a viewer may interact with during decision periods, the selection of which results in a particular multimedia segment being seamlessly played following the conclusion of the current segment), timers (e.g., a clock or other graphical or textual countdown indicating the amount of time remaining to select an option or next segment, which, in some cases, may be the amount of time remaining until the current segment will transition to the next segment), links, popups, an index (for browsing and/or selecting other multimedia content to view or listen to), and/or a dynamic progress bar such as that described in U.S. patent application Ser. No. 13/622,795, filed Sep. 19, 2012, and entitled "Progress Bar for Branched Videos," the entirety of which is incorporated by reference herein. In addition to visual elements, sounds or other sensory elements may be presented. For example, a timer may have a "ticking" sound synchronized with the movement of a clock hand. The interactive interface elements may be shared among multimedia segments or may be unique to one or more of the segments.

In one implementation, the Event Analyzer 410 evaluates data received from one or more input engines that are participating in a session and, based on the evaluation, determines how the multimedia presentation should continue. For example, referring again to the interactive music video discussed above, the data received from the input engines may indicate the selection of a particular singer to continue the song. The choice may be associated with a particular algorithm that the Event Analyzer 410 uses to determine the behavior of the multimedia presentation. If the choice is associated with a voting mechanism, the Event Analyzer 410 will determine the singer having the most votes and, in response, the Manager 110 may direct any output engines in the session to seamlessly transition to playing the content segment associated with the highest-voted singer. Other algorithms are possible, such as a bidding algorithm in which an option requested by a highest bidder is presented to viewers.

The Event Analyzer 410 may evaluate other types of user interactions. For example, the Manager 110 may direct all output engines to pause playback if a pause event is received from any input engine. In other embodiments, users are able to send messages or chat with each other, or cause text, images, or sounds to be output to one or more other output engines via the Manager 110. Messages may include, for example, suggested content segments for selection, allowing viewers to "lobby" for particular selections from among those available for subsequent playback. One skilled in the art will appreciate the various interactions received by the Event Analyzer 410 that may affect playback of the multimedia presentation.

In one embodiment, the Event Distributer 415 manages distribution of instructions, messages, updates, and other data to the output engines participating in a session. The Event Distributer 415 informs each output engine how to proceed with playback of the multimedia presentation. The instructions sent by the Event Distributer 415 may be based on prior user interactions received and evaluated by the Event Analyzer 410. Notably, the Event Distributer 415 may provide different instructions to different output engines depending on characteristics associated with a user or device. In one example, an interactive video presents male and female viewers with the option of having a character in the video spend the night studying or go out for entertainment. Upon a determination by the Manager 110 that the majority of the viewers have voted for the character to seek entertainment, the Event Distributer 415 sends instructions to output engines associated with male viewers to play a segment in which the character attends a sports game. For female viewers, the Event Distributer 415 instead sends instructions to cause playback of a segment in which the character sees a movie. The Event Distributor 415 may also send events input engines; e.g., the Event Distributer 415 may send synchronizing events to the input engines 210 and/or provide instructions on what interface elements should be presented to users.

Referring still to FIG. 4, the Choice Manager 420 may interface with the Project Configuration Manager 405, the Event Analyzer 410, and the Event Distributer 415. For example, in one embodiment, the Choice Manager 420 receives selected content segments and/or other user interaction information after processing by the Event Analyzer 410. Based on this information in combination with a multimedia content path structure received from the Project Configuration Manager 405, the Choice Manager 420 determines the next multimedia content segment(s) that should be played and provides the determination to the Event Distributor 415, which distributes the appropriate instructions to output devices.

As described above, the Event Distributer 415 may provide different instructions to input output engines. In some embodiments, these instructions are based on instructions from the Choice Manager 420. For example, referring again to the study-or-party interactive video described above, the majority of viewers may vote for the character to head to the library. These votes (interactions) are received from the input devices at the Event Analyzer 410 component of the Manager 110, which determines, based on a voting algorithm, that the winning selection is that the character should study. This determination of the winning selection is received by the Choice Manager 420, which may examine the content path structure provided by the Project Configuration Manager 405 to determine which content segment should be played after the current content segment, given that the character should be shown studying. Upon determining the correct segment to play (which may include different segments for different devices and/or users, as indicated above), the Choice Manager 420 informs the Event Distributer 415 of the next segment to be played or action that should be taken, and the Event Distributer 415 communicates to the output engines 230 (and/or input engines 210) the instructions necessary for the next segment/action to take effect.

Figure 5:
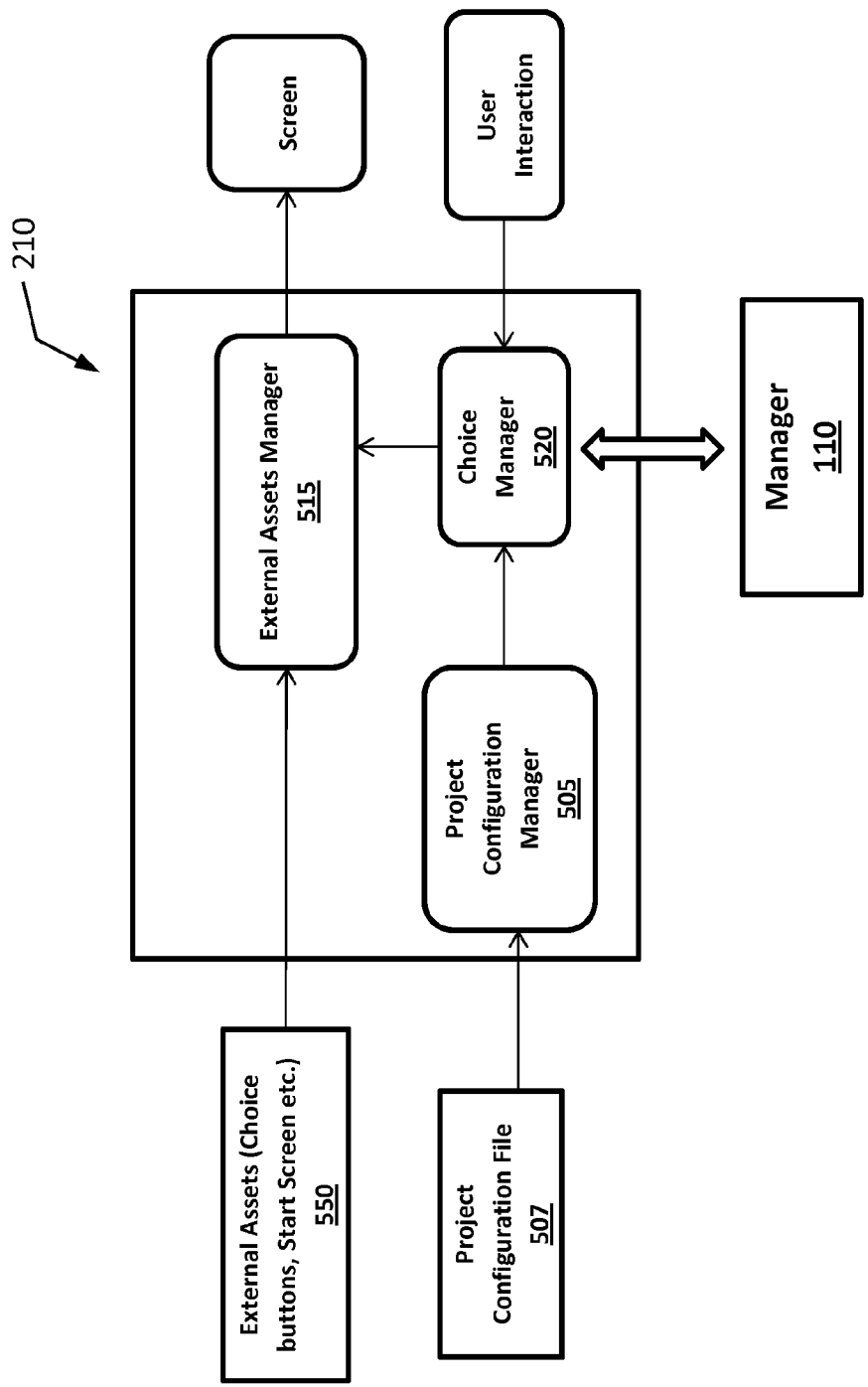
FIG. 5 is an exemplary diagram illustrating an input engine component according to an embodiment of the invention.

Each device that enables a user to interact with a multimedia presentation as described herein may include an input engine 210, as depicted in FIG. 5. The input engine 210 may perform a number of input functions, including receiving timing/synchronization events from the Manager 110, presenting interface elements to a user (e.g., segment select options, presentation control buttons, timers, etc.), collecting user interactions (e.g., when and how the user interacts with the multimedia presentation or interface elements, which option(s) are selected, and so on), and sending user interactions to the Manager 110. In some embodiments, users are able to interact with an input device in real-time, during playback of the multimedia presentation. In this manner, users may receive substantially instant feedback to their interactions.

In one embodiment, an input engine 210 includes a Project Configuration Manager 505, External Assets Manager 515, and Choice Manager 520. Similar to the Project Configuration Manager 405 described with respect to the Manager 110, the Project Configuration Manager 505 in the input engine 210 may read from a project configuration file 507 that defines the content path structure of the multimedia presentation, e.g., how the multimedia content segments may be linked together in various manners to form one or more content paths (in some embodiments, a video tree). The configuration file 507 may further specify which audio, video, and/or other media files correspond to each content segment, and may indicate the interface elements that should be displayed or otherwise presented to users, as well as when the elements should be displayed. In some embodiments, the configuration file 507 is substantially similar or identical to the project configuration file 407 utilized by the Manager 110. The configuration file 507 may be stored on the device associated with the input engine 210, or the file 507 may be remotely accessed by the Project Configuration Manager 505.

The External Assets Manager 515 component of the input engine 210 manages assets 550 associated with a multimedia presentation, including user interface elements such as segment choice buttons/thumbnails, splash screens, timers, playback control buttons, and other visual and/or audio interactive or display elements. Upon direction from the Choice Manager 520, the External Assets Manager 515 sends the assets for display/playback in accordance with the timeline of the multimedia presentation.

The input engine 210 may also include a Choice Manager 520, which receives user interactions (e.g., mouse clicks, keyboard presses, touchpad presses, etc.) that may be translated into actions associated with the multimedia presentation (e.g., segment selections, playback controls, etc.) and provides them to the Manager 110, which processes the actions as described above. In addition to receiving user interactions, the Choice Manager 520 may receive other events or data, such as video and/or audio recorded previously or in real-time by the user, images, text (e.g., real-time chat) or other data uploads, such as information associated with the device user (e.g., user name, avatar, social networking account information, demographics, etc.), or device itself (e.g., GPS location, device type, device model, etc.). The events, actions, and/or data may be provided to the Choice Manager 520 automatically, or as a result of an action taken by the user.

The input engine 210 may also receive events from the Manager 110. For example, the Event Distributor 415 may send synchronizing events to the input engine 210 and/or provide instructions on what interface elements should be presented to the user and when they should be presented, in accordance with a common presentation timeline. Taking into account events received from the Manager 110 as well as the path structure of the multimedia content received from the Project configuration Manager 505, the Choice Manager 520 informs the External Assets Manager 510 of the interface elements that should be presented to the user and the timing of the presentation.

In some embodiments, the Choice Manager 520 instructs the External Assets Manager 510 to present interface elements based on information associated with the device and/or device user. For example, in one example of the present invention, a group of viewers in a movie theater can use their mobile devices (e.g., smartphones, tablets, etc.) to vote on how a currently playing movie should proceed. In this instance, the Choice Manager 520 receives data from each participating mobile device indicating whether it is, e.g., an Android® smartphone, or an Apple® iPad® tablet. When a point in the movie timeline is reached where user interface elements are to be presented to the users, the Choice Manager 520 may direct the External Assets Manager 510 to provide customized interface elements to each user's device based on the properties of the device, e.g., different graphical themes that correlate with the design of the device.

In some embodiments, the input engine 210 also includes functionality to cause media to be presented on an input device, similar to the functionality provided by the output engine 230, further described below. For example, the input engine 210 may cause an input device to play the same audio, video, and/or other media as is simultaneously presented on one or more output devices participating in the same session. In another example, the input engine 210 may cause personalized media content to be played on an associated input device, such as audio, video, imagery, or other content based on a particular user, the user's device, and/or interactions or content segment selections made by the user. For example, if there is one device used for output but there are multiple input devices, the present system may display global video (i.e., video common to all users) with global data on the screen, while simultaneously providing each user with individualized video, data, and selection options. The foregoing example may operate with multiple output devices as well (e.g., multiple screens showing a globally-presented video). Individualized content may include customized ending options; for example, at the end of the multimedia presentation, each user may be provided with one of multiple possible endings and/or an individualized ending. Such an ending may include displaying a winner, comparing the performance of the user to other users, and so on.

Figure 6:
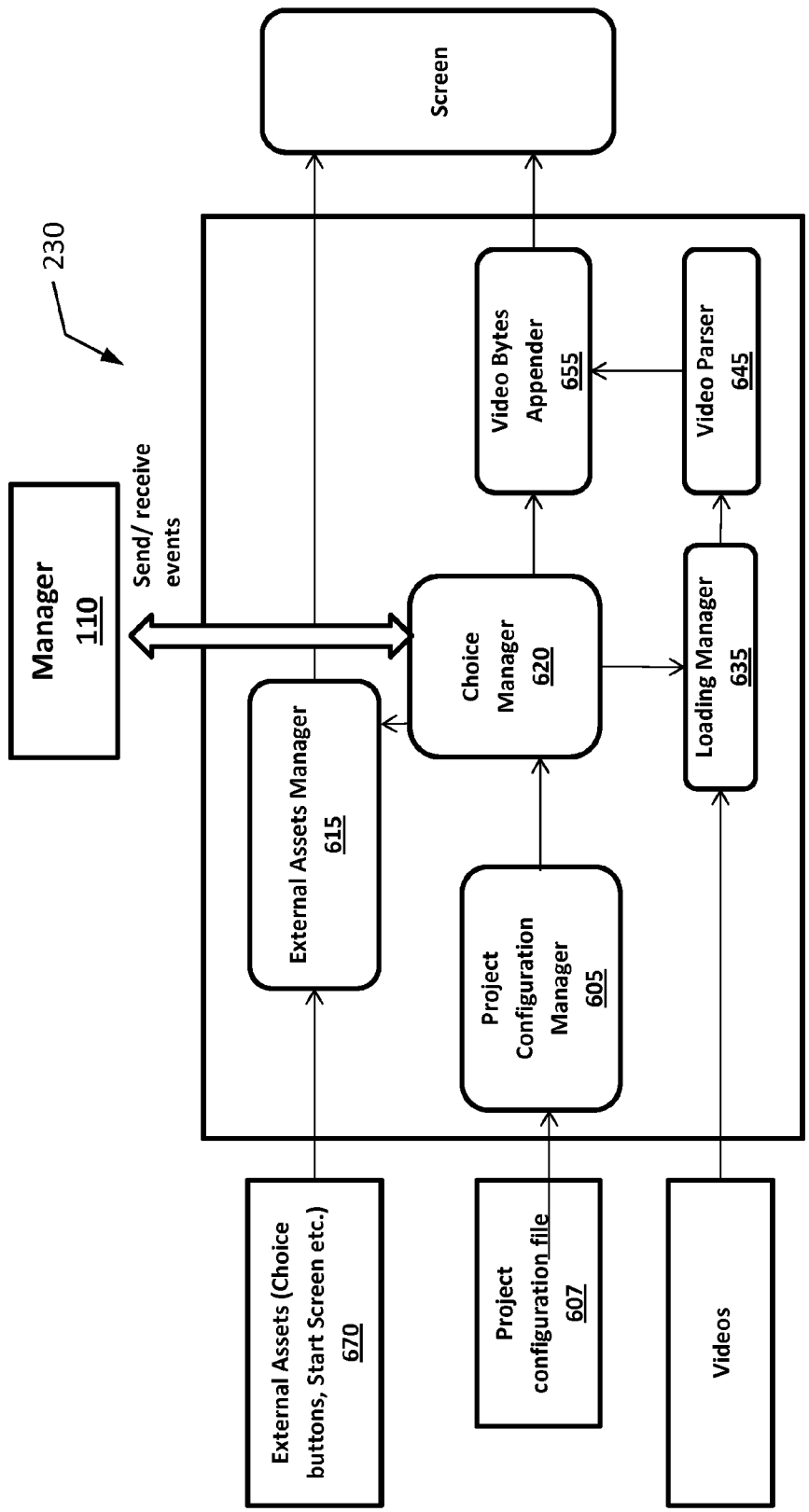
FIG. 6 is an exemplary diagram illustrating an output engine component according to an embodiment of the invention.

Each device that enables a user to view, listen to, or engage in other sensory perception with, a multimedia presentation as described herein may include an output engine 230, as depicted in FIG. 6. The output engine 230 may perform a number of output functions, including receiving synchronization events from the Manager 110 to synchronize the output engine 230 to a common session timeline, intelligently downloading media content, and seamlessly playing multimedia content to a viewer according to instructions received from the Manager 110.

In one embodiment, each output engine 230 includes a Project Configuration Manager 605, External Assets Manager 615, Choice Manager 620, Loading Manager 635, Video Parser, 645, and Video Bytes Appender 655. Similar to the Project Configuration Managers 405 and 505 described with respect to the Manager 110 and input engine 210, the Project Configuration Manager 605 in the output engine 230 may read from a project configuration file 607 that defines the content path structure of the multimedia presentation, e.g., how the multimedia content segments may be linked together in various manners to form one or more content paths (in some embodiments, a video tree). The configuration file 607 may further specify which audio, video, and/or other media files correspond to each content segment, and may indicate the interface elements that should be displayed or otherwise presented to users, as well as when the elements should be displayed. In some embodiments, the configuration file 607 is substantially similar or identical to the project configuration file 507 utilized by the input engine 210 and/or the project configuration file 407 utilized by the Manager 110. The configuration file 607 may be stored on the device associated with the output engine 230, or the file 607 may be remotely accessed by the Project Configuration Manager 605.

The External Assets Manager 615 component of the output engine 230 manages and retrieves assets 670 associated with a multimedia presentation, such as audio, video, and/or other media files, as well as user interface elements such as segment choice buttons/thumbnails, splash screens, timers, playback control buttons, and other visual and/or audio interactive or display elements. The External Assets Manager 615 may cause the same or similar interface elements to be shown on an output device as are shown on an input device. In some embodiments, the External Assets Manager 615 causes the display of real-time status messages or other indications of activities performed on input devices; e.g., how many and/or which users voted for a particular option, information about users (photo, Facebook user name, etc.), the options selected by the users, and so on. Upon direction from the Choice Manager 620, the External Assets Manager 615 may send the assets for display/playback in accordance with the timeline of the multimedia presentation.

The Loading Manager 635 manages the downloading of streaming media according to a loading logic. In one embodiment, the Loading Manager 635 receives the media content path structure from the Project Configuration Manager 605 and events from the Choice Manager 620 and, based on the path structure and events, determines which media segments to download and/or buffer (if the segments are remotely stored). For example, if the Choice Manager informs the Loading Manager 635 that a particular segment A will be played at an upcoming point in the timeline, the Loading Manager 635 may intelligently request for download, in advance of playback or notification of potential playback, additional media segments X, Y and Z that may be played following segment A. The downloading may occur even if fewer than all of X, Y, Z will be played (e.g., if X, Y and Z are potential segment choices branching off segment A).

In some embodiments, the Loading Manager 635 ceases or cancels downloading of content segments or other media if it determines that it is no longer possible for a particular media content segment (or other content) to be presented on a currently traversed media path. Referring to the above example, a user may select, via an input engine 210, segment Y as the next segment to be played. The selection may be relayed to the Manager 110, which processes the selection and notifies the Choice Manager 620 output engine 230. The Choice Manager 620 may then inform the Loading Manager 635 of the selection event and, based on the Loading Manager's 635 knowledge of the content path structure of the multimedia presentation, the Loading Manager 635 may stop active downloads or dequeue pending downloads of content segments no longer reachable now that segment Y has been selected.

The output engine 230 may also include Video Parser 645 and Video Bytes Appender 655 modules. In one embodiment, the Video Parser 645 receives media content from the Loading Manager 635 and analyzes and/or modifies the raw video or other media content, for example, to concatenate two separate media streams into a single timeline. The Video Parser 645 may also insert cue points and other event markers, such as junction events, into media streams. The Video Bytes Appender 655 processes media content output by the Video Parser 645. For instance, the Video Bytes Appender 655 may form one or more streams of bytes from multiple video, audio or other media streams, and feed the formed streams such that there is seamless playback of the combined media content. The Video Bytes Appender 655 may be directed by the Choice Manager 620 to stream media in synchronization with other modules of the output engine 230, such as the External Assets Manager 615.

Referring still to FIG. 6, the output engine Choice Manager 620 interfaces with other modules of the output engine 230 as well as with the Manager 110. In one embodiment, the Choice Manager 620 receives the content path structure for the current multimedia presentation from the Project Configuration Manager 605, listens for and receives user interactions and other events sent to it by the Manager 110, and notifies the Loading Manager 635 of events, such as the selection of a content segment for playback. In some embodiments, based on its analysis of received events, the Choice Manager 635 is able to cause the presentation of any form of sensory output connected to the output engine 230, such as visual, aural, tactile, olfactory, and the like. For example, if a theater audience controlling an interactive film with their mobile devices votes to send a character to the beach, the output engine may cause the activation of fans in the theater to simulate wind, along with the release of ocean scents in the air, in addition to playback of the associated audiovisual segment.

In some implementations, the input engines 210 and/or output engines 230 participating in a playback session of a multimedia presentation track data regarding user interactions, users, and/or devices and provide the data to the Manager 110 for the collection of various analytics. Collected analytics may include, but are not limited to: the number, type, and/or location of a device; user data, such as login information, name, address, age, sex, and the like; user interactions, such as button/touchpad presses, mouse clicks, mouse/touchpad movements, interaction timings, and the like; decisions made by users or automatically (e.g., content segment user choice or default selection); and content paths followed in the presentation content structure. The analytics may include those described in U.S. patent application Ser. No. 13/034,645, entitled "System and Method for Data Mining within Interactive Multimedia," and filed Feb. 24, 2011, the entirety of which is incorporated by reference herein. Those skilled in the art will appreciate the various analytics available for collection and analysis in the present system.

The present invention may be used in a variety of applications, including but not limited to the scenarios described herein. In one exemplary embodiment, a user watches selectably presentable video content on his television (which includes an output engine 230) and can direct the path of the video by interacting with his smartphone or tablet (which includes an input engine 210). In this example, the Manager 110 may be integrated or collocated with the output engine 230 (see FIG. 3A) or input engine 210 (see FIG. 3B) or in an entirely separate location (see FIG. 3C). Another such application is a live sporting event played on an output device (e.g., television) while allowing for the control of certain events from an input device. For example, a viewer may use an Apple® iPad® tablet to jump to video of an event having previously occurred during the game and save the video as a new content segment. The television, upon direction of the Manager 110, may then transition to the new segment for playback and return to the broadcast stream thereafter (see FIGS. 3A-3C).

In another embodiment, multiple users view an interactive movie in a movie theater and vote or bid to direct its path. In this case, the output engine 230 may be stored on or executable by the movie theater projection system, with the projection screen acting as a display, and each user in the audience may have a smartphone, tablet, or other mobile or fixed device having an input engine 210 that receives user interactions and forwards them to the Manager 110, which may be separate from or collocated with the output engine 230 (see FIGS. 3D and 3E).

In another exemplary implementation, an interactive game show is presented on a television (having an output engine 230), with multiple participants interacting through suitable respective input devices 102 (having input engines 210). Questions are presented to the participants on the television, and answers are collected by the Manager 110 via the input devices. The Manager 110 directs the flow of the game show content based on the participant interactions. The Manager 110 may be collocated with or separate from the output engine 230 (see FIGS. 3D and 3E).

In one application, a multimedia presentation includes selectably presentable content segments forming various paths of a video storyline that can be traversed and interacted with by viewers. In this example, there may be multiple input devices 102 having input engines 210 and multiple output devices 106 having output engines 230, each of which interacts with a separately located Manager 110 (see FIG. 3F). Alternatively, there may be multiple devices, with at least one having both an input engine 210 and an output engine 230 (see FIG. 3G). Each user (or group of users) may view the interactive video from its own output device 106, and the video may be personalized to that user (or group of users). For example, a male viewer may view/participate in the video storyline as a male character, and a female viewer may view/participate in the video storyline as a female character. In either case, each video may be a particular point of view of a character appearing in the same video storyline, which is presented simultaneously on a common timeline for each viewer.

In another example using the configuration of FIG. 3G (or any other suitable configuration), one user may control the output of another user's device. For example, a videoconference, chat, or other form of communication may occur among two or more participants during playback of a media presentation. In other embodiments, one user may make segment selections or perform other actions on his or her own device that cause particular output, such as video and/or audio, to be presented on another user's device.

One skilled in the art will recognize the various forms in which the systems and methods described herein may be implemented. The functions provided by the Manager 110, input engines 210, output engines 230, and/or other components may be implemented in any appropriate hardware or software. If implemented as software, the invention may execute on a system capable of running a commercial operating system such as the Microsoft Windows® operating systems, the Apple OS X® operating systems, the Apple iOS® platform, the Google Android™ platform, the Linux® operating system and other variants of UNIX® operating systems, and the like.

Some or all of the described functionality may be implemented in a media player and/or other software downloaded to or existing on the viewer's device. Some of the functionality may exist remotely; for example, management functions may be performed on one or more remote servers. In some embodiments, the viewer's device serves only to provide output and input functionality, with the remainder of the processes being performed remotely.

The local and/or remote software may be implemented on hardware such as a smart or dumb terminal, network computer, personal digital assistant, wireless device, smartphone, tablet, television, gaming device, music player, mobile telephone, laptop, palmtop, wireless telephone, information appliance, workstation, minicomputer, mainframe computer, or other computing device, that is operated as a general purpose computer or a special purpose hardware device that can execute the functionality described herein. The software may be implemented on a general purpose computing device in the form of a computer including a processing unit, a system memory, and a system bus that couples various system components including the system memory to the processing unit.

The described systems may include a plurality of software processing modules stored in a memory and executed on a processor in the manner described herein. The program modules may be in the form of any or more suitable programming languages, which are converted to machine language or object code to allow the processor or processors to read the instructions. The software may be in the form of a standalone application, implemented in any suitable programming language or framework.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories may store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

In various embodiments, the devices include a web browser, client software, or both. The web browser allows the client to request a web page or other downloadable program, applet, or document (e.g., from the server(s)) with a web page request. One example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client manually requests a web page from the server. Alternatively, the device automatically makes requests with the web browser. Examples of commercially available web browser software are Microsoft® Internet Explorer®, Mozilla® Firefox®, and Apple Safari®.

In some embodiments, the devices include client software. The client software provides functionality to the device that provides for the implementation and execution of the features described herein. The client software may be implemented in various forms, for example, it may be in the form of a web page, widget, and/or Java, JavaScript, .Net, Silverlight, Flash, and/or other applet or plug-in that is downloaded to the device and runs in conjunction with the web browser. The client software and the web browser may be part of a single client-server interface; for example, the client software can be implemented as a "plug-in" to the web browser or to another framework or operating system. Any other suitable client software architecture, including but not limited to widget frameworks and applet technology may also be employed with the client software.

A communications network may connect the devices with one or more servers and/or with each other. The communication may take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network may carry TCP/IP protocol communications, and HTTP/HTTPS requests made by a web browser, and the connection between the clients and servers can be communicated over such TCP/IP networks. The type of network is not a limitation, however, and any suitable network may be used.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs may be implemented in any programming language. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A system for multiple device interaction with selectably presentable multimedia content, the system comprising:
    a memory for storing a branching multimedia presentation having a playback timeline, the branching multimedia presentation comprising a plurality of traversable content paths each comprising a plurality of selectably presentable multimedia content segments, wherein each multimedia content segment is associated with a particular portion of the playback timeline;
    a first output engine executing on a first device having a display screen to:
        receive a first subset of the multimedia content segments;
        assemble the first subset of the multimedia content segments into a first one of the content paths of the branching multimedia presentation; and
        display to a first user on the display screen of the first device the first subset of the multimedia content segments in the first content path in synchronization with the playback timeline based on the respective associations of the first subset of the multimedia content segments with the particular portions of the playback timeline;
    a second output engine executing on a second, different device having a display screen to:
        receive a second subset of the multimedia content segments, the second subset of the multimedia content segments being different from the first subset of the multimedia content segments, the second subset of the multimedia content segments being associated with same portions of the playback timeline as the first subset of the multimedia content segments;
        assemble the second subset of the multimedia content segments into a second one of the content paths of the branching multimedia presentation, the second content path being different from the first content path; and
        for each multimedia content segment in the second subset of the multimedia content segments, display to a second, different user on the display screen of the second device the multimedia content segment in the second subset of the multimedia content segments in the second content path simultaneously with the displaying, by the first output engine, of the multimedia content segment in the first subset of the multimedia content segments that corresponds to the same portion of the playback timeline;
    at least one input engine to receive user interactions associated with the branching multimedia presentation; and
    a manager to coordinate the branching multimedia presentation among a plurality of devices based at least in part on the user interactions,
    wherein the first output engine and the second output engine simultaneously begin playing the branching multimedia presentation at a same point of time in a same playback timeline, and wherein, during a same period of time on the same playback timeline, the first output engine displays to the first user on the display screen of the first device a first multimedia content segment of the multimedia presentation and the second output engine displays to the second user on the display screen of the second device a second, different multimedia content segment of the multimedia presentation.

2. The system of claim 1, wherein at least one of the multimedia content segments comprises a predefined decision period during which a user may select, as that multimedia content segment is playing, a subsequent multimedia content segment to be played immediately following a conclusion of the playing multimedia content segment.

3. The system of claim 2, wherein the input engine further presents to a user, during a predefined decision period as the multimedia content segment is playing, visual representations of two or more alternative multimedia content segments from which a subsequent multimedia content segment may be selected.

4. The system of claim 3, wherein the input engine further presents to the user, upon reaching the predefined decision period, a visual representation of a time interval representing an amount of time permitted for selection of one of the alternative multimedia content segments.

5. The system of claim 1, wherein at least one of the multimedia content segments comprises a predefined decision period during which a user may select, as that multimedia content segment is playing, a subsequent multimedia content segment to be played immediately following selection of the subsequent multimedia content segment.

6. The system of claim 1, wherein the input engine comprises a plurality of input engines, each to execute on a different one of the devices.

7. The system of claim 6, wherein each of the input engines provides interactive options to a user based in part on at least one of a characteristic of a user associated with one of the devices, and a characteristic of one of the devices.

8. The system of claim 1, wherein the first output engine and the input engine each execute on a different one of the devices.

9. The system of claim 1, wherein the manager executes on the first device.

10. The system of claim 1, wherein the manager executes on the second device.

11. The system of claim 1, wherein the manager executes on a third one of the devices.

12. The system of claim 1, wherein coordinate the branching multimedia presentation comprises synchronize the devices to a common timeline.

13. The system of claim 1, wherein the manager comprises an event analyzer to evaluate user interactions received from the at least one input engine and, based on the evaluation, selecting one or more of the multimedia content segments to provide to at least one of the first output engine and the second output engine.

14. The system of claim 1, wherein the input engine receives user interactions simultaneously with playback of the branching multimedia presentation by the first output engine.

15. A method for multiple device interaction with selectably presentable multimedia content, the method comprising:
    storing a branching multimedia presentation having a playback timeline, the branching multimedia presentation comprising a plurality of traversable content paths each comprising a plurality of selectably presentable multimedia content segments, wherein each multimedia content segment is associated with a particular portion of the playback timeline;

receiving, by a first output engine executing on a first device having a display screen, a first subset of the multimedia content segments;

assembling, by the first output engine, the first subset of the multimedia content segments into a first one of the content paths of the branching multimedia presentation; and displaying to a first user on the display screen of the first device, by the first output engine, the first subset of the multimedia content segments in the first content path in synchronization with the playback timeline based on the respective associations of the first subset of the multimedia content segments with the particular portions of the playback timeline;

receiving, by a second output engine executing on a second, different device having a display screen, a second subset of the multimedia content segments, the second subset of the multimedia content segments being different from the first subset of the multimedia content segments, the second subset of the multimedia content segments being associated with same portions of the playback timeline as the first subset of the multimedia content segments;

assembling, by the second output engine, the second subset of the multimedia content segments into a second one of the content paths of the branching multimedia presentation, the second content path being different from the first content path; and for each multimedia content segment in the second subset of the multimedia content segments, displaying to a second, different user on the display screen of the second device, by the second output engine, the multimedia content segment in the second subset of the multimedia content segments in the second content path simultaneously with the displaying, by the first output engine, of the multimedia content segment in the first subset of the multimedia content segments that corresponds to the same portion of the playback timeline;

receiving, by an input engine, user interactions associated with the branching multimedia presentation;

coordinating, by a manager, the branching multimedia presentation among a plurality of devices based at least in part on the user interactions, wherein the first output engine and the second output engine simultaneously begin playing the branching multimedia presentation at a same point of time in a same playback timeline, and wherein, during a same period of time on the same playback timeline, the first output engine displays to the first user on the display screen of the first device a first multimedia content segment of the multimedia presentation and the second output engine displays to the second user on the display screen of the second device a second, different multimedia content segment of the multimedia presentation.

16. The method of claim 15, wherein at least one of the multimedia content segments comprises a predefined decision period during which a user may select, as that multimedia content segment is playing, a subsequent multimedia content segment to be played immediately following a conclusion of the playing multimedia content segment.

17. The method of claim 16, further comprising presenting, by the input engine, during a predefined decision period as the multimedia content segment is playing, visual representations of two or more alternative multimedia content segments from which a subsequent multimedia content segment may be selected.

18. The method of claim 17, further comprising presenting, by the input engine, upon reaching the predefined decision period, a visual representation of a time interval representing an amount of time permitted for selection of one of the alternative multimedia content segments.

19. The method of claim 15, wherein at least one of the multimedia content segments comprises a predefined decision period during which a user may select, as that multimedia content segment is playing, a multimedia subsequent content segment to be played immediately following selection of the subsequent multimedia content segment.

20. The method of claim 15, wherein the input engine comprises a plurality of input engines, the method further comprising configuring each of the input engines to execute on a different one of the devices.

21. The method of claim 20, further comprising providing, by at least one of the input engines, interactive options to a user based in part on at least one of a characteristic of a user associated with one of the devices, and a characteristic of one of the devices.

22. The method of claim 15, further comprising configuring each of the first output engine and the input engine to execute on a different one of the devices.

23. The method of claim 15, further comprising configuring the manager to execute on the first device.

24. The method of claim 15, further comprising configuring the manager to execute on the second device.

25. The method of claim 15, further comprising configuring the manager to execute on a third one of the devices.

26. The method of claim 15, wherein coordinating the branching multimedia presentation comprises synchronizing the devices to a common timeline.

27. The method of claim 15, wherein the manager comprises an event analyzer, the method further comprising evaluating, by the event analyzer, user interactions received from the at least one input engine and, based on the evaluation, selecting one or more of the multimedia content segments to provide to at least one of the first output engine and the second output engine.

28. The method of claim 15, further comprising receiving, by the input engine, user interactions simultaneously with playback of the branching multimedia presentation by the first output engine.

* * * * *